(12) United States Patent
Baek

(10) Patent No.: US 9,750,316 B2
(45) Date of Patent: Sep. 5, 2017

(54) BUCKLE APPARATUS FOR WEARABLE DEVICE

(71) Applicant: Samsung Electronics Co., Ltd., Gyeonggi-do (KR)

(72) Inventor: Sangin Baek, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 15 days.

(21) Appl. No.: 14/847,339

(22) Filed: Sep. 8, 2015

(65) Prior Publication Data
US 2016/0081440 A1 Mar. 24, 2016

(30) Foreign Application Priority Data

Sep. 23, 2014 (KR) .......................... 10-2014-0126991

(51) Int. Cl.
*A44C 5/24* (2006.01)
*G06F 1/16* (2006.01)
(52) U.S. Cl.
CPC .............. *A44C 5/246* (2013.01); *A44C 5/243* (2013.01); *G06F 1/163* (2013.01); *Y10T 24/2155* (2015.01); *Y10T 24/4782* (2015.01)
(58) Field of Classification Search
CPC ..... A44C 5/243; A44C 5/246; Y10T 24/4782; Y10T 24/2155; Y10T 24/4736
See application file for complete search history.

(56) References Cited

U.S. PATENT DOCUMENTS

| 2,190,878 | A | | 2/1940 | Lundman | |
|---|---|---|---|---|---|
| 3,795,028 | A | * | 3/1974 | Weiss | ...................... A44B 11/25 24/191 |
| 4,332,061 | A | * | 6/1982 | Rieth | ................... A44C 5/2042 24/265 WS |
| 6,163,941 | A | | 12/2000 | Lai | |
| 6,311,373 | B1 | * | 11/2001 | Hashimoto | .............. A44C 5/24 24/265 WS |
| 2012/0110792 | A1 | | 5/2012 | Granito | |

FOREIGN PATENT DOCUMENTS

EP    2 248 437 A1    11/2010

OTHER PUBLICATIONS

European Search Report, dated Feb. 17, 2016.

* cited by examiner

*Primary Examiner* — Robert J Sandy
(74) *Attorney, Agent, or Firm* — Cha & Reiter, LLC

(57) ABSTRACT

A buckle apparatus for a wearable device may include a main body of the wearable device; a band for wearing the main body on a user's wrist; and a buckle assembly including a cover part to which a first end of the band is coupled and a coupling part in which a second end of the band is inserted into and maintained. The cover part includes upper and lower covers coupled to each other to form rails, and the coupling part includes first and second link pieces hingedly coupled to each other and is assembled to the lower portion of the cover part.

19 Claims, 14 Drawing Sheets

BUCKLE APPARATUS FOR WEARABLE DEVICE

CLAIM OF PRIORITY

This application claims the benefit under 35 U.S.C. §119 (a) of Korean patent application filed on Sep. 23, 2014 in the Korean Intellectual Property Office and assigned Serial number 10-2014-0126991, the entire contents of which is hereby incorporated by reference.

BACKGROUND

1. Technical Field

The present disclosure generally relates to a length-adjustable buckle apparatus and, more specifically, relate to a buckle apparatus for a wearable device that can conveniently adjust the length of a band of the wearable device.

2. Description of the Related Art

In recent years, with the development of wearable device industries, smart glasses, smart watches, fitness bands, wearable robots, and the like have been the main spotlight in promising fields.

Among them, watch or band type wearable devices to be worn on wrists have well-known fastening structures (e.g., a wristband). Particularly, watch type wearable devices adopt buckle structures that are similar to traditional watches, and there is no need for a user to frequently change the wearing states of the fastening structure (e.g., the length of the wristband) during use. That is, up to now it has not been necessary for users to frequently adjust band lengths. When an adjustment to the length of the band is required, users unlock buckles, completely release the wearing states of devices, adjust the lengths of the bands to desired lengths, and then wear and use the devices again.

However, in the case of watch type wearable devices, there is a growing need for users to frequently adjust the lengths of bands according to their desired conditions.

However, since various types of sensors are mounted on wearable devices, close contact between the sensors and users' body parts on which the wearable devices are worn is required for the operations of the sensors. In order to meet the need that the sensors be at a desired distance or proximity with particular body parts, band lengths often have to be frequently adjusted. In the case of buckle apparatuses that secure the wearable device to the body part, adjustment of the band length necessitates completely releasing opposite ends of a strap from one another and removing the device from the body part. Completely removing the device from the body part and releasing the ends of the strap from one another is relatively cumbersome and inconvenient. Therefore, the buckle apparatuses in the related art are inadequate.

SUMMARY

An aspect of the present disclosure is to provide a buckle apparatus for a wearable device in which a band length is adjustable according to a user's desired condition of use and adjust a feeling of close contact with the band in an easy and simple manner.

In accordance with an aspect of the present disclosure, a buckle apparatus for a wearable device may comprise: a main body of the wearable device; a band for wearing the main body on a user's wrist; and a buckle assembly comprising a cover part to which a first end of the band is coupled and a coupling part into which a second end of the band may be inserted and secured. The cover part may comprise upper and lower covers that are coupled to each other to form rails, and the coupling part comprises first and second link pieces hingedly coupled to each other, and is assembled to a lower portion of the cover part.

The buckle apparatus for the wearable device may further comprise: a sliding locking part comprising a sliding assembly for locking sliding of the cover part, a stopper that is movable up and down according to the sliding of the sliding assembly, and a spring for pressing the sliding assembly in one direction.

The sliding locking part may further comprise a plate spring. Opposite ends of the sliding locking part may be coupled to the upper cover and the stopper, respectively.

The sliding assembly may have a pin-coupling hole that is positioned between the rails to move along the rails formed by the upper and lower covers.

The sliding assembly may further comprise sliding frames formed on opposite sides thereof to move along the rails formed in the cover part, a positioning protrusion on which the plate spring is seated, and an insertion protrusion inserted into the spring.

The first link piece may comprise pin-coupling holes that are formed on opposite ends thereof and a fastening piece protruding downward from the rear surface thereof between the pin-coupling holes. The second link piece may comprise an insertion piece on one end thereof into which the second end of the band is inserted. An opening may be formed on the upper portion of the insertion piece. A protruding piece may integrally protrude from the front surface of the insertion piece. A pin-coupling hole may be formed on an opposite end of the front surface of the insertion piece, and may correspond to the pin-coupling hole provided in the first link piece. A pole may protrude downward from the center of the insertion piece.

The fastening piece of the first link piece may be fastened to the opening formed in the insertion piece of the second link piece such that the length of the band is set to a basic fastening length for wearing the wearable device.

The pole of the second link piece may be inserted into one of a plurality of fastening holes formed on the second end of the band such that the band is set to a basic fastening length.

The plate spring may comprise a corrugated section that is bent a predetermined number of times and has resilience. A screw-fastening piece may be formed on one end thereof, and may be screw-coupled to the upper cover. A fastening hook may be formed on an opposite end thereof, and may be fastened to the stopper. The stopper may comprise a fastening recess to which the fastening hook is fastened.

The upper cover may comprise a band fixing part into which the one end of the band is inserted, a spring accommodating part formed to accommodate a spring therein, and a screw-fastening part.

The lower cover may comprise rail frames formed on opposite sides thereof, an opening formed in the center thereof, a stopper coupling part to which the stopper is coupled so as to be movable up and down, a spring accommodating part for accommodating the spring therein, screw-fastening holes formed on opposite sides of the spring accommodating part, and a pair of fastening protrusions inserted into a pair of insertion holes formed on the one end of the band.

The upper cover and the lower cover may comprise a screw fastening part and a screw-fastening hole, respectively. The screw fastening part and the screw-fastening hole are formed to correspond to each other.

The sliding assembly of the sliding locking part may slide in an opposite direction to the sliding of the cover part to compress the spring, and the stopper may move downward and may be stopped by the second link piece to lock the sliding of the cover part.

While the stopper moves downward and is stopped by the second link piece, the stopper may be moved upward by the sliding of the cover part in an opposite direction, and the sliding assembly may return to an original position by the resilience of the spring.

These and other aspects of the present disclosure are further described with reference to the accompanying drawings.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
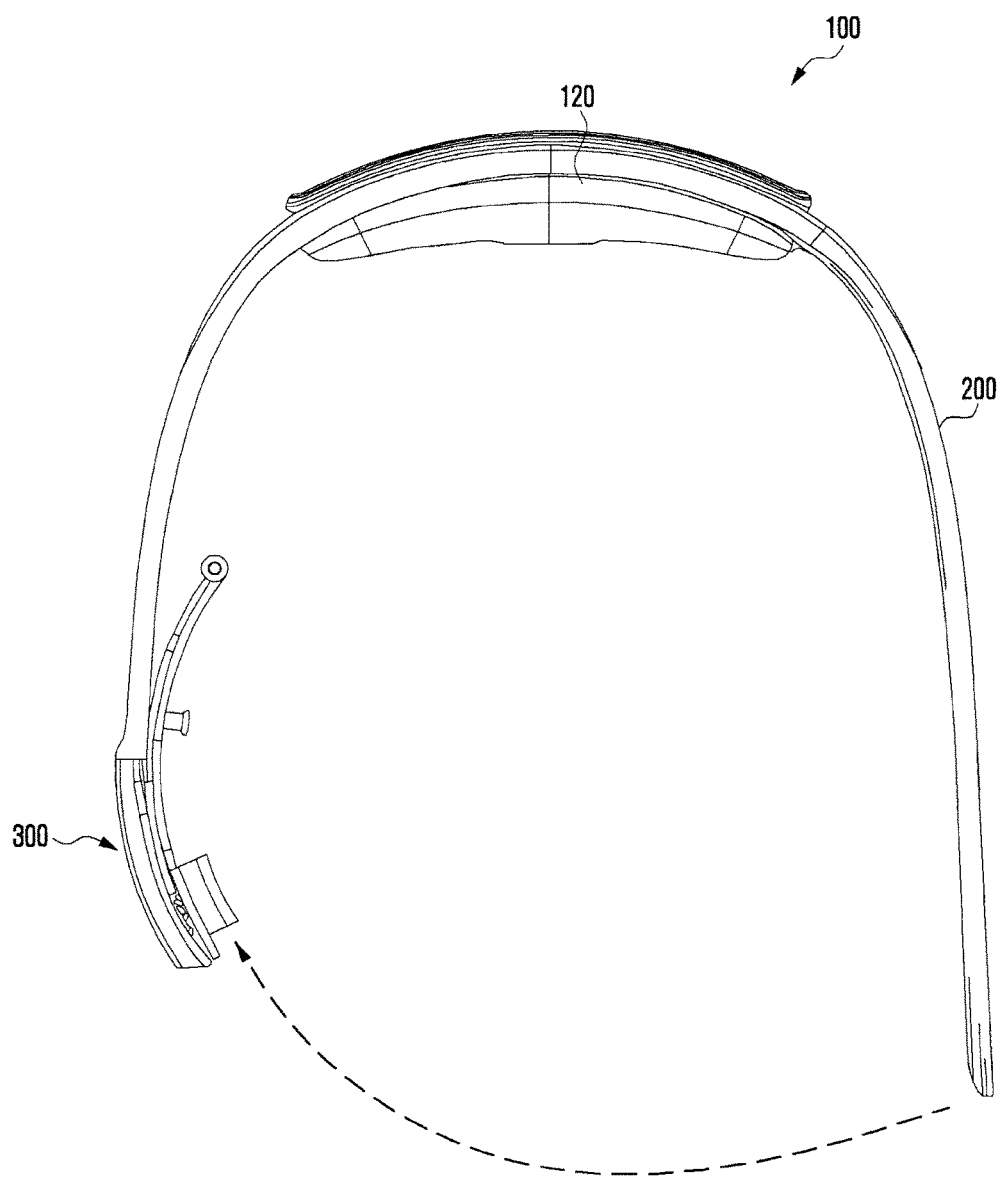
FIG. 1 is a side view illustrating a buckle apparatus for a wearable device according to an embodiment of the present disclosure.
Figure 2:
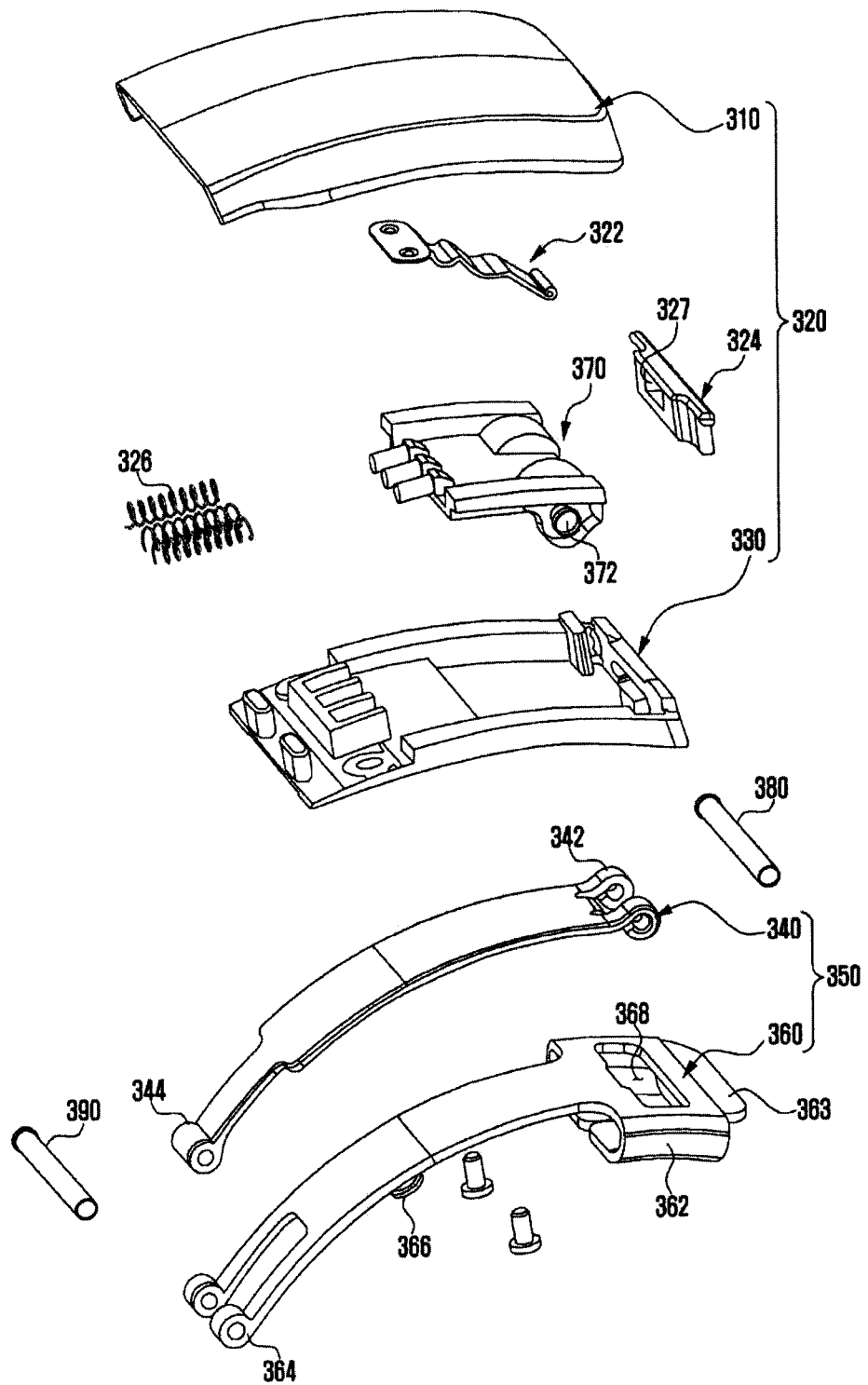
FIG. 2 is an exploded perspective view illustrating a configuration of a buckle assembly of the buckle apparatus illustrated in FIG. 1.
Figure 3:
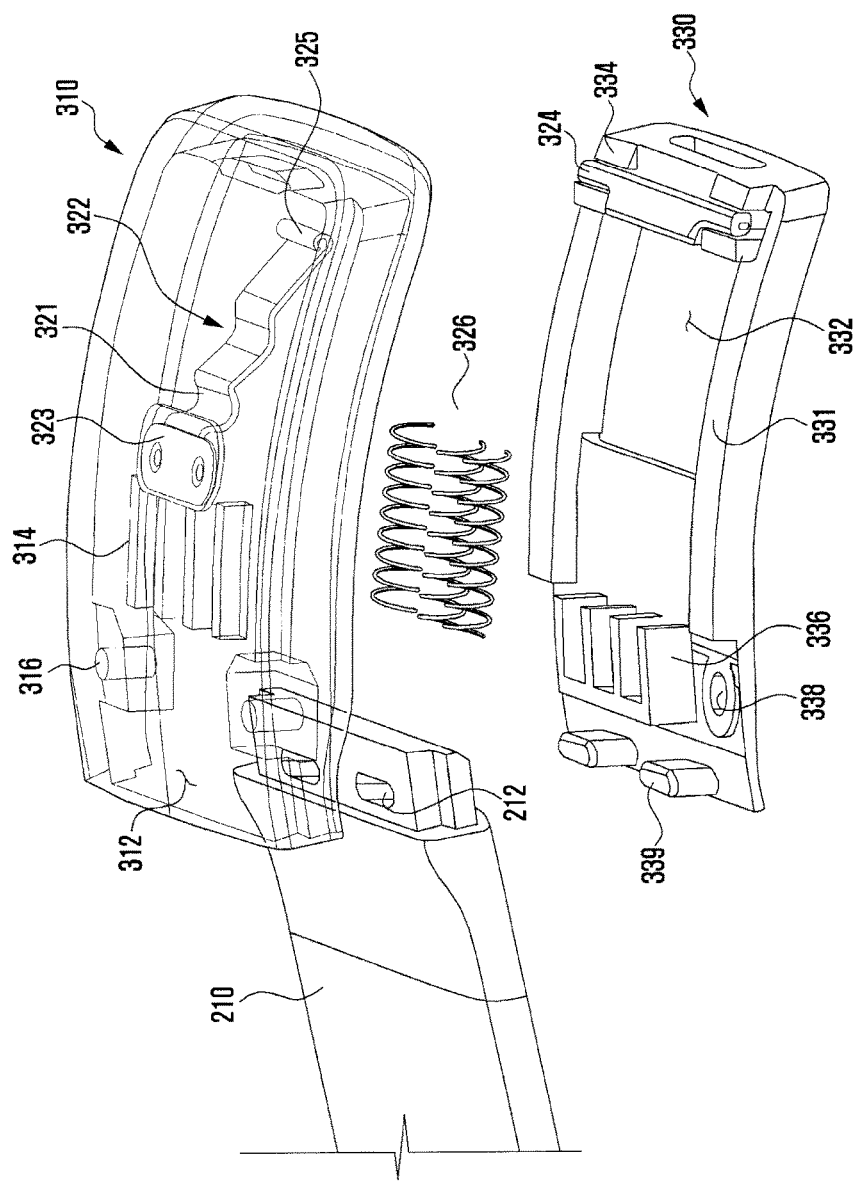
FIG. 3 is an exploded perspective view illustrating a state where one end of a band is coupled to a cover part of the buckle assembly of FIG. 2.
Figure 4:
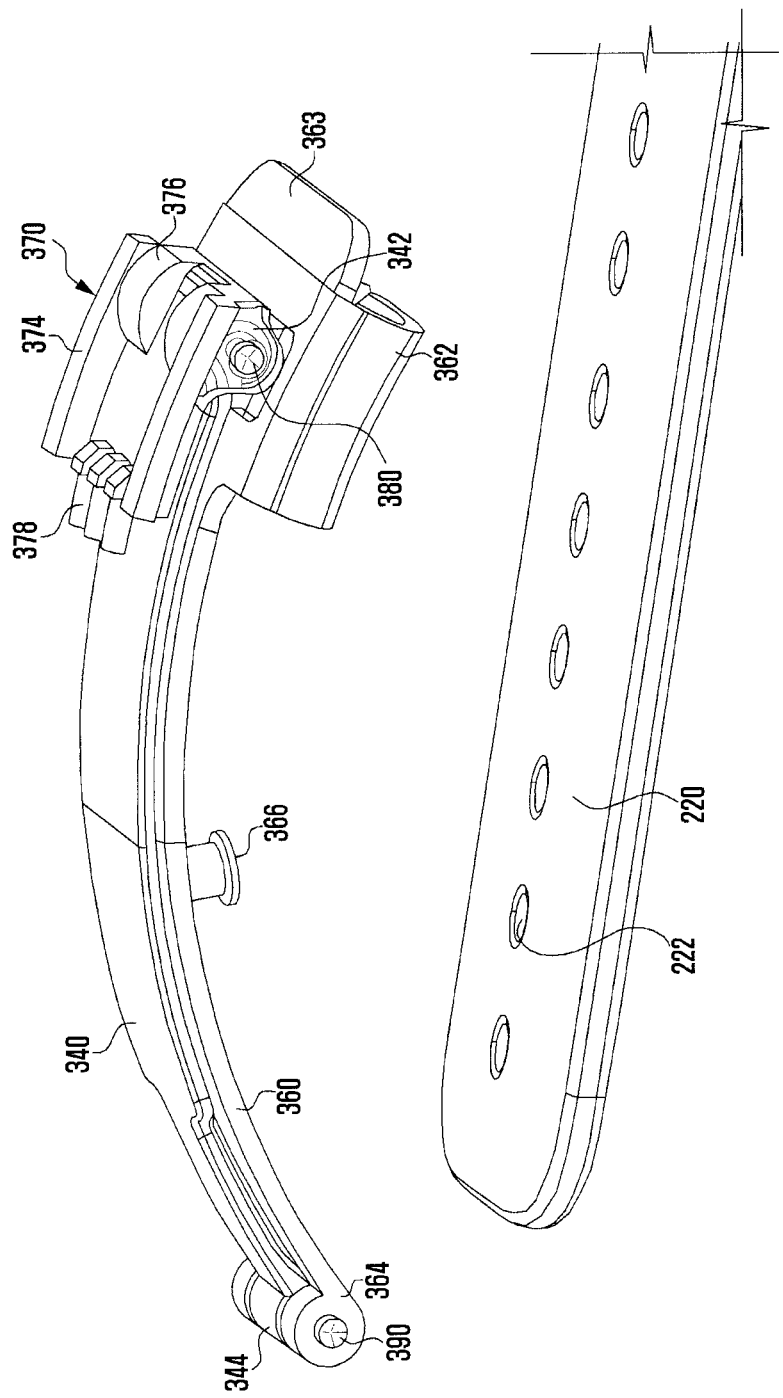
FIG. 4 is a perspective view illustrating a state where a coupling part of the buckle assembly of FIG. 2 is coupled to a sliding assembly and an opposite end of the band.
Figure 5:
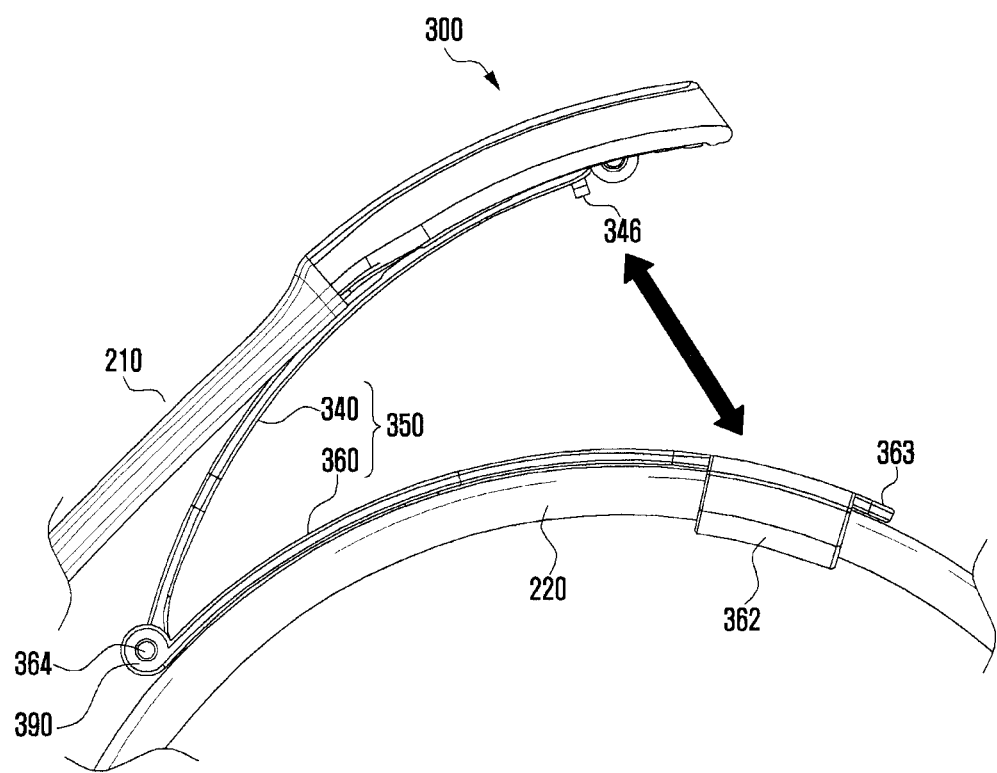
FIG. 5 is a side view illustrating an operation of the buckle assembly and the coupling part illustrated in FIG. 2.

Hereinafter, the present disclosure will be described in detail with reference to the accompanying drawings. The present disclosure may have various embodiments, and modifications and changes may be made therein without departing from the scope and spirit of the present disclosure. Therefore, it should be understood that there is no intent to limit the present disclosure to the particular forms, and the present disclosure should be construed to cover all modifications, equivalents, and/or alternatives falling within the spirit and scope of the present disclosure. In describing the drawings, the same or similar elements are designated by similar reference numerals. As illustrated in FIG. 1, A buckle apparatus 100 is shown and described with reference to FIGS. 1-5 in which FIG. 1 illustrates a buckle apparatus for a wearable device according to an embodiment of the present disclosure, FIG. 2 illustrates a configuration of the buckle assembly illustrated in FIG. 1, FIG. 3 illustrates a cover part of the buckle assembly illustrated in FIG. 2, FIG. 4 illustrates a coupling part of the buckle assembly illustrated in FIG. 2, and FIG. 5 illustrates an operation of the buckle assembly and the coupling part illustrated in FIG. 2.

The buckle apparatus 100 of the present disclosure may include a main body 120 of the wearable device, a band 200 for wearing the main body 120 on a user's wrist, and a buckle assembly 300 for fastening opposite ends of the band 200 in order to maintain the main body 120 at a desired wearing position. The buckle assembly 300 may include a cover part 320 to which one end 210 of the band 200 is coupled and a coupling part 350 assembled to the lower portion of the cover part 320 such that an opposite end 220 of the band 200 is inserted into and maintained in the coupling part 350.

The cover part 320 may include an upper cover 310 and a lower cover 330 which are coupled to each other to form rails.

The cover part 320 may include a sliding locking part between the upper cover 310 and the lower cover 330 to lock the sliding thereof. The sliding locking part may include a plate spring 322, a stopper 324 installed to be movable up and down, a plurality of springs 326, (e.g., three springs 326), and a sliding assembly 370. The springs 326 may be, for example, a coil spring that can press the sliding assembly 370 toward the stopper 324.

In this case, in order to move along the rails, the sliding assembly 370 may have a pin-coupling hole 372 formed on the lower portion of one end thereof which is inserted between the rails. The rails may be formed by screw-coupling the upper and lower covers 310, 330.

The coupling part 350 includes a first link piece 340 and a second link piece 360 that are hingedly coupled to each other. The first link piece 340 may have a pair of pin-coupling holes 342 formed on one end thereof and one pin-coupling hole 344 formed on an opposite end thereof.

The second link piece 360 may have, on one end thereof, an insertion piece 362 into which the opposite end 220 of the band 200 is inserted and, on an opposite end thereof, a pair of pin-coupling holes 364 which correspond to the pin-coupling hole 344 formed on the opposite end of the first link piece 340. The insertion piece 362 may have an opening 368 formed on the upper portion thereof in which the pin-coupling hole 372 of the sliding assembly 370 is accommodated.

Further, the first link piece 340 may have a fastening piece 346 protruding downward from the rear surface thereof between the pair of pin-coupling holes 342. The second link piece 360 may have a pole 366 protruding downward from the center thereof. The insertion piece 362 may have a protruding piece 363 integrally formed therewith. The protruding piece 363 may protrude a predetermined distance from the front surface of the insertion piece 362.

The fastening piece 346 of the first link piece 340 may be fastened to the opening 368 formed in the insertion piece 362 of the second link piece 360 such that the length of the band 200 may be set to a basic fastening length for wearing the wearable device.

A first pin 380 may be inserted as a hinge pin into the pair of pin-coupling holes 342 formed on the one end of the first link piece 340 and the pin-coupling hole 372 of the sliding assembly 370. A second pin 390 may be inserted as a hinge pin into the pin-coupling hole 344 formed on the opposite end of the first link piece 340 and the pair of pin-coupling holes 364 formed on the opposite end of the second link piece 360. As a result, the first link piece 340 and the sliding assembly 370 may be hingedly coupled to each other with the first pin 380 as a hinge shaft. The first link piece 340 and the second link piece 360 may be hingedly coupled to each other with the second pin 390 as a hinge shaft.

Accordingly, the wearable device may be worn on the user's wrist by rotating the first and second link pieces 340, 360 away from each other with the second pin 390 as the hinge shaft.

The band 200 may have a pair of insertion holes 212 formed on the one end 210 thereof, which enable the one end 210 of the band 200 to be secured to the cover part 320. The band 200 may further include a plurality of fastening holes 222 formed on the opposite end 220 thereof. The length of the band 200 may be adjusted by inserting the pole protruding downward from the center of the second link piece 360 into one of the fastening holes 222.

Referring back to FIGS. 2 and 3, the plate spring 322 may include a corrugated section 321 that is bent a predetermined number of times and has resilience, a screw-fastening piece 323 formed on one end thereof, which is screw-coupled to the upper cover 310, and a fastening hook 325 formed on an opposite end thereof, which is fastened to the stopper 324. The stopper 324 may have a fastening recess 327 to which the fastening hook 325 is fastened. The upper cover 310 may include a band fixing part 312 into which the one end 210 of the band 200 is inserted, spring accommodating parts 314 in which the springs 326 are accommodated, respectively, and screw-fastening parts 316.

The lower cover 330 may include rail frames 331 formed on opposite sides thereof, an opening 332 formed in the center thereof, a stopper coupling part 334 formed in front of the opening 332 such that the stopper 324 is coupled thereto to be movable up and down, spring accommodating parts 336 formed in rear of the opening 332 to accommodate the springs 326, respectively, screw-fastening holes 338 formed on opposite sides of the spring accommodating parts 336, and a pair of fastening protrusions 339 inserted into the pair of insertion holes 212 formed on the one end 210 of the band 200.

The spring accommodating parts 314 and the screw fastening parts 316 of the upper cover may be formed to correspond to the spring accommodating parts 336 and the screw-fastening holes 338 of the lower cover 330, respectively.

In addition, the sliding assembly 370 may further include sliding frames 374 formed on opposite sides thereof to move along the rails formed in the cover part 320. The sliding assembly 370 may further include a pair of positioning protrusions 376 which is formed above the pin-coupling hole 372 to correspond thereto and on which the corrugated section 321 of the plate spring 322 is seated. Insertion protrusions 378 may be inserted into the springs 326, respectively.

The positioning protrusions 376 may have a semi-circular section with a radius corresponding to the radius of curvature of the corrugated section 321 of the plate spring 322.

Figure 6:
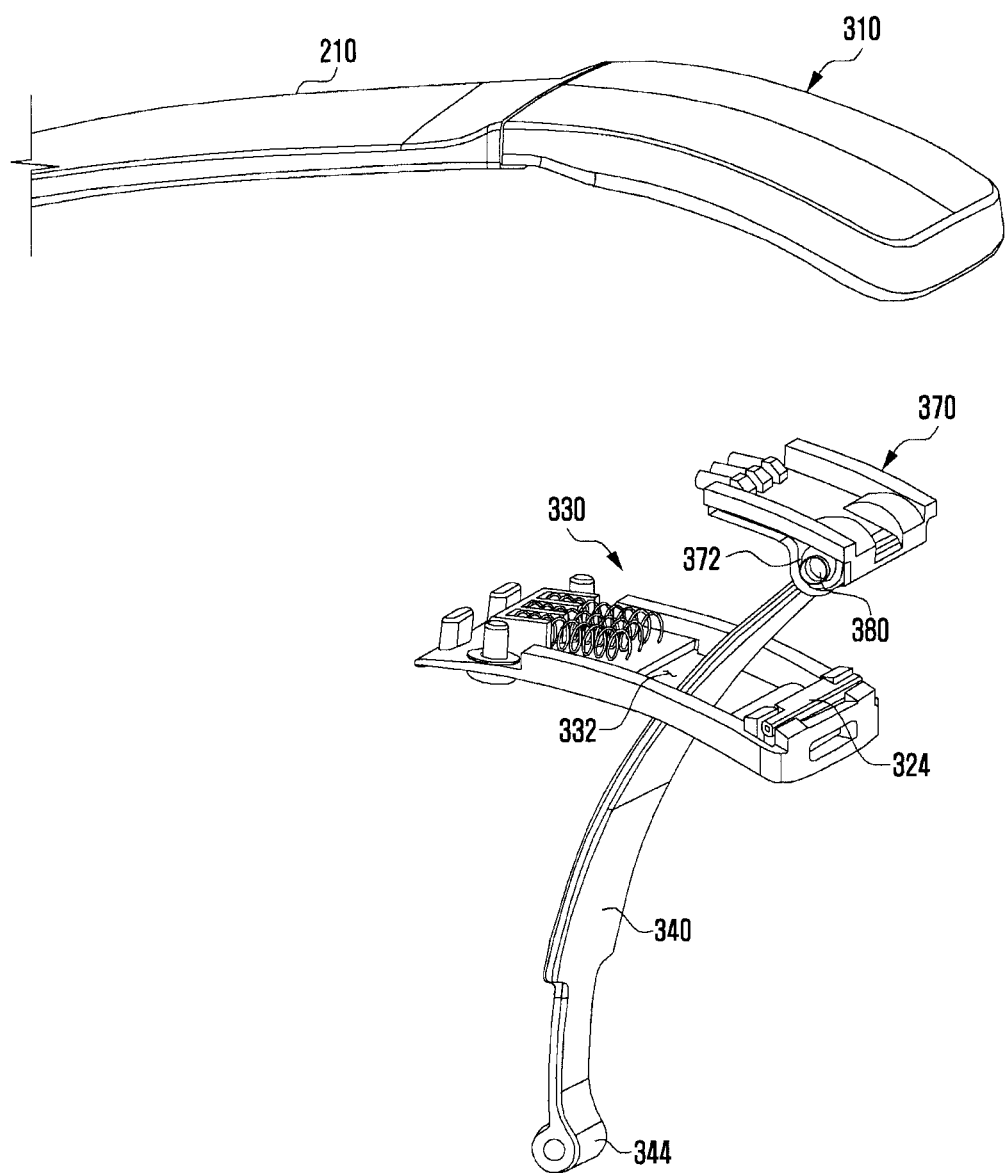
FIG. 6 is an exploded perspective view illustrating a state where the sliding assembly of FIG. 4 is assembled to upper and lower covers while coupled to a first link piece.
Figure 7:
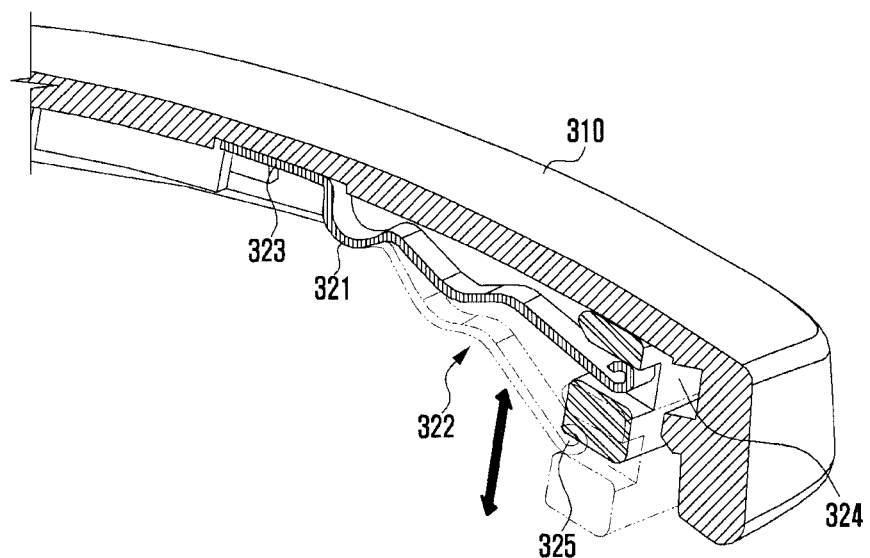
FIG. 7 is a schematic cutaway view illustrating a state where a stopper coupled to an opposite end of a plate spring moves up and down while one end of the plate spring is secured to the upper cover.
Figure 8:
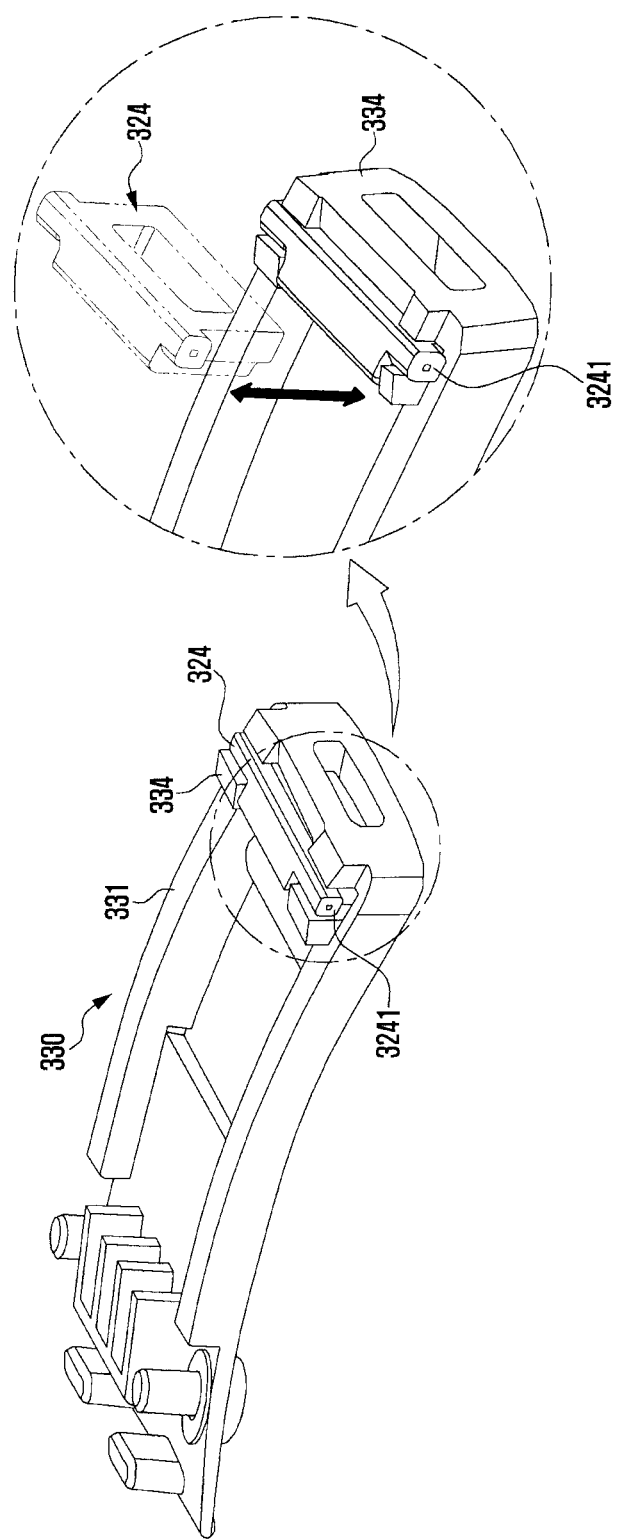
FIG. 8 illustrates a state where the stopper is coupled to a stopper coupling part of the lower cover so as to be movable up and down, where a circled portion in FIG. 8 is a detailed view of an indicated area of interest.

FIG. 6 illustrates a state where the sliding assembly of FIG. 4 is assembled to the upper cover while coupled to the first link piece. FIG. 7 illustrates a state where the stopper coupled to the opposite end of the plate spring moves up and down while the one end of the plate spring is secured to the upper cover. FIG. 8 illustrates a state where the stopper is coupled to the stopper coupling part of the lower cover so as to be movable up and down, where a circle portion in FIG. 8 is a detail view.

As illustrated in FIG. 6, the first link piece 340 and the sliding assembly 370 may be hingedly coupled to each other with the first pin 380 as a hinge shaft by passing the first link piece 340 through the opening 332 of the lower cover 330 and then inserting the first pin 380 into the pin-coupling holes 342 of the first link piece 340 and the pin-coupling hole 372 of the sliding assembly 370.

The upper cover 310 may be coupled to the one end 210 of the band 200, and the lower cover 330 may be coupled (e.g., screw-coupled) to each other.

As illustrated in FIG. 7, the screw fastening piece 323 may have a rectangular plate shape, which is formed on the one end of the plate spring 322, and may be coupled (e.g., screw-coupled) to the upper cover 310. The fastening hook 325 may be formed on the opposite end of the plate spring 322 and may be fastened to the fastening recess 327 of the stopper 324. The corrugated section 321 of the plate spring 322 between the screw fastening piece 323 and the fastening hook 325 may move while being coupled to be horizontal or inclined between the upper cover 310 and the stopper 324 as the stopper 324 moves up and down from the stopper coupling part 334 as indicated by the directional arrow.

As illustrated in FIG. 8, although the stopper 324 slides up and down along the stopper coupling part 334 by the movement of the sliding assembly 370, the stopper 324 moves downward when the sliding assembly 370 moves forward, and the protruding piece 363 of the second link piece 360 accordingly collides with the lower end of the stopper 324 having moved downward, which results in locking of the sliding assembly 370. At the same time, stopping protrusions 3241 horizontally protruding from the upper portion of the stopper are stopped by the upper surfaces of the rail frames 331 on the opposite sides of the lower cover 330 so that the stopper 324 may not move downward any more.

An operation of the buckle apparatus 100 of the present disclosure, configured as described above, will be described below with reference to FIGS. 9 to 11.

Figure 9:
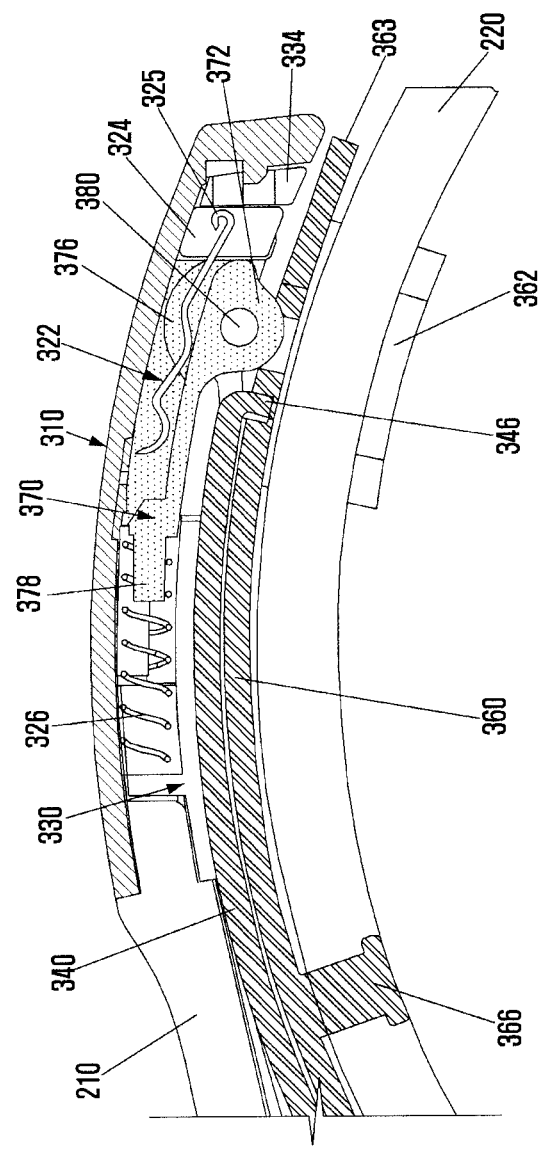
FIG. 9 is a sectional view illustrating an initial state where the first link piece and the second link piece are fastened to each other.

FIG. 9 illustrates an initial state where the first link piece and the second link piece are fastened to each other.

Specifically, the main body 120 of the wearable device may be worn on a user's wrist by accommodating the stopper 324 in the stopper coupling part 334 and inserting the pole 366, which protrudes downward from the center of the second link piece 360, into one of the fastening holes 222 formed on the opposite end 220 of the band 200.

Figure 10:
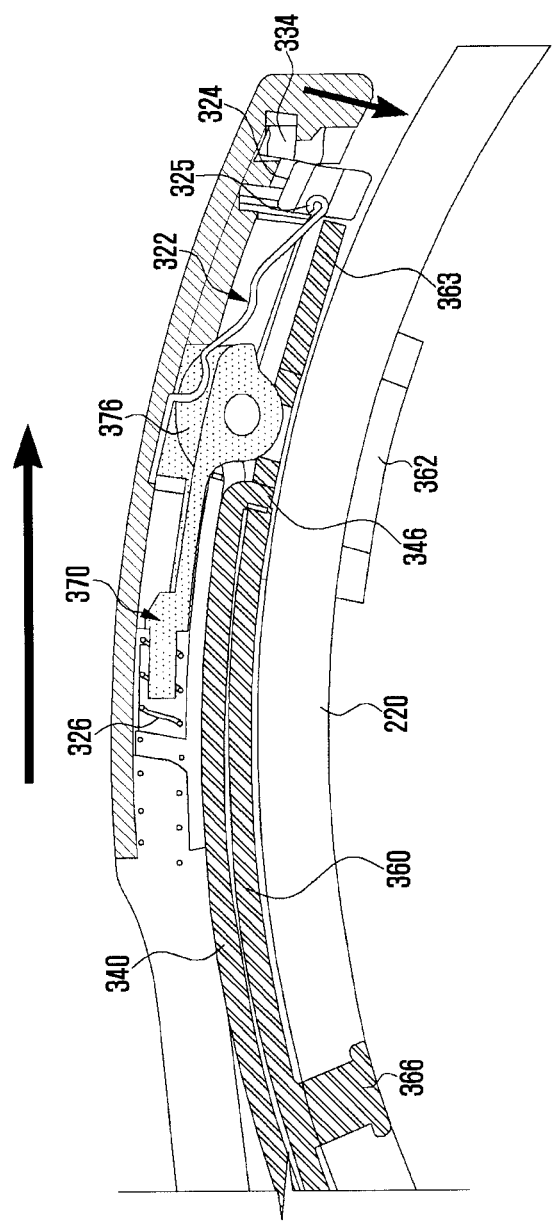
FIG. 10 is a sectional view illustrating a locked state where the stopper protrudes downward by the sliding of the upper cover in the state of FIG. 9 and is stopped by a protruding piece of the second link piece.

In this state, as illustrated in FIG. 10, when the cover part 320 is slid in a direction indicated by the directional arrow, the sliding assembly 370 slides toward the rear of the upper cover 310 along the rail frames 331 of the lower cover 330 and compresses the springs 326, and the corrugated section 321 of the plate spring 322 is seated on the positioning protrusions 376 of the sliding assembly 370 at the same time.

Further, the stopper 324 slides downward from the stopper coupling part 334, and the lower end of the stopper 324 is stopped by the protruding piece 363 of the second link piece 360 so that the stopper 324 is locked. Accordingly, the length of the band 200 worn on the wrist may be adjusted, whereby a feeling of close contact with the band 200 may be adjusted according to a condition of use which the user wants.

At this time, the corrugated section 321 of the plate spring 322 moves while being coupled to be inclined between the upper cover 310 and the stopper 324, thereby obtaining resilience.

Figure 11:
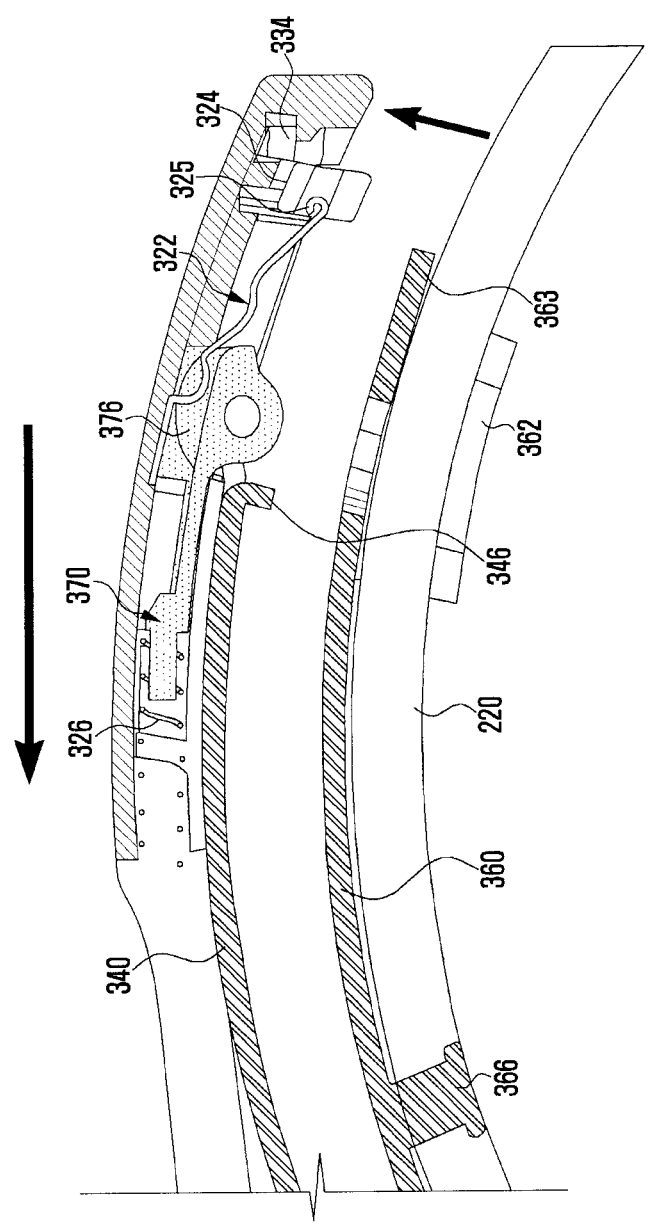
FIG. 11 is a sectional view illustrating an unlocked state where the stopper protrudes upward from the protruding piece of the second link piece by the sliding of the upper cover in an opposite direction in the state of FIG. 10.

In this state, the cover part 320 is slightly pulled in the direction of the arrow of FIG. 10 and then, as illustrated in FIG. 11, slid back in the opposite direction to that illustrated in FIG. 10. Then, the stopper 324 moves upward according to the sliding of the cover part 320, the lower end of the stopper 324, which is stopped by the protruding piece 363 of the second link piece 360, is released, and the sliding assembly 370 returns to the original position illustrated in FIG. 9 by the resilience of the compressed springs 326.

Figure 12:
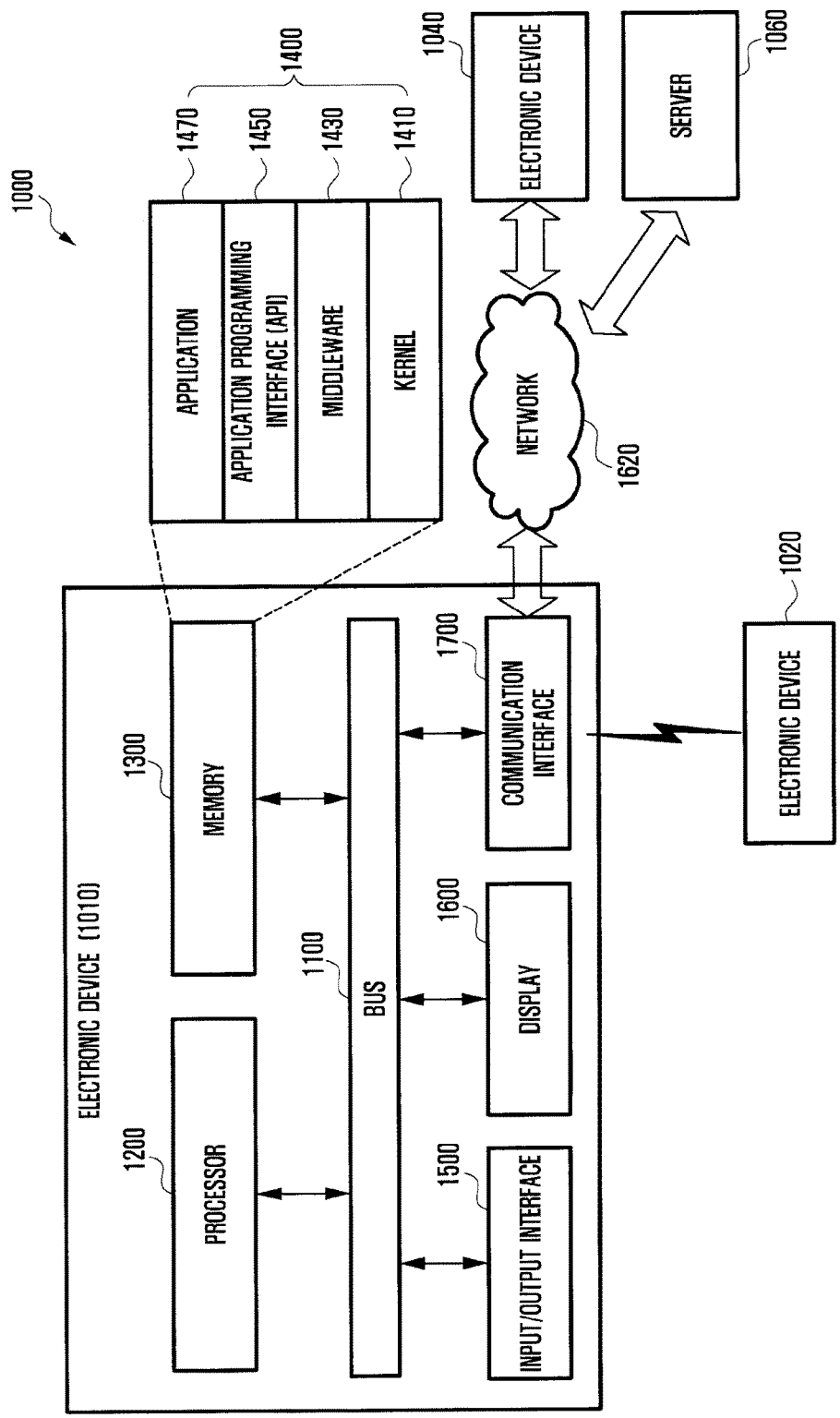
FIG. 12 is a block diagram illustrating a network environment including therein an electronic device in accordance with various embodiments of the present disclosure.

FIG. 12 is a block diagram illustrating a network environment 1000 including therein an electronic device 1010 in accordance with an embodiment of the present disclosure. The electronic device 1010 may include, but not limited to, a bus 1100, a processor 1200, a memory 1300, an input/output interface 1500, a display 1600, and a communication interface 1700.

The bus 1100 may be a circuit designed for connecting the above-discussed elements 1100-1700 and communicating data (e.g., a control message) between such elements.

The processor 1200 may include one or more of a Central Processing Unit (CPU), an Application Processor (AP), and a Communication Processor (CP). For example, the processor 1200 may carry out operations or data processing related to control and/or communication of at least one other component of the electronic device 1010.

The memory 1300 may include a volatile memory and/or a non-volatile memory. The memory 1300 may store, for example, commands or data related to at least one other component of the electronic device 1010. According to an embodiment, the memory 1300 may store software and/or a program 1400.

The memory 1300 may store therein software and/or program 1400. The program 1400 may include a kernel 1410, a middleware 1430, an application programming interface (API) 1450, and an application 1470. At least some of the kernel 1410, the middleware 1430, and the API 1450 may be referred to as an Operating System (OS).

The kernel 1410 may control or manage system resources (e.g., the bus 1100, the processor 1200, or the memory 1300, etc.) used for performing operations or functions of the other programming modules, e.g., the middleware 1430, the API 1450, or the application 1470. Additionally, the kernel 1410 may offer an interface that allows the middleware 1430, the API 1450 or the application 1470 to access, control or manage individual elements of the electronic device 1010.

The middleware 1430 may perform intermediation by which the API 1450 or the application 1470 communicates with the kernel 131 to transmit or receive data. Additionally, in connection with task requests received from the applications 1470, the middleware 1430 may perform a control (e.g., scheduling or load balancing) for the task request by using technique such as assigning the priority for using a system resource of the electronic device 1010 (e.g., the bus 1100, the processor 1200, or the memory 1300, etc.) to at least one of the applications 1470.

The API 1450, which is an interface for allowing the application 1470 to control a function provided by the kernel 1410 or the middleware 1430, may include, for example, at least one interface or function (e.g., a command) for a file control, a window control, an image processing, a text control, and the like.

The input/output interface 1500 may deliver commands or data, entered by a user through an input/output unit (e.g., a sensor, a keyboard, or a touch screen), to the processor 1200, the memory 1300, or the communication interface 1700 via the bus 1100. For example, the input/output interface 1500 may offer data about a user's touch, entered through the touch screen, to the processor 1200. Also, through the input/output unit (e.g., a speaker or a display), the input/output interface 1500 may output commands or data, received from the processor 1200, the memory 1300, or the communication interface 1700 via the bus 1100. For example, the input/output interface 1500 may output voice data, processed through the processor 1200, to a user through the speaker.

The display 1600 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 1600 may display thereon various types of information (e.g., multimedia data, text data, image, video, icon, or symbol, etc.) to a user. The display 1600 may include a touch screen, and may receive, for example, a touch, gesture, proximity, or hovering input by using an electronic pen or a part of the user's body.

The communication interface 1700 may perform a communication between the electronic device 1010 and any external electronic device (e.g., the electronic device 1040 of the server 1060). For example, the communication interface 1700 may communicate with any external device by being connected with a network 1620 through a wired or wireless communication.

A wireless communication may include, but not limited to, at least one of WiFi (Wireless Fidelity), BT (Bluetooth), NFC (Near Field Communication), GPS (Global Positioning System), or a cellular communication (e.g., LTE (long-term evolution), LTE-A (LTE Advance), CDMA (code division multiple access), WCDMA (wideband CDMA), UMTS (universal mobile telecommunications system), WiBro (Wireless Broadband), or GSM (Global System for Mobile Communications), etc.). Further, the wireless communication may include a near field communication 1640. The near field communication 1640 may include at least one of WiFi (wireless fidelity), Bluetooth, NFC (near field communication), or GPS (global positioning system).

A wired communication may include, but not limited to, at least one of USB (Universal Serial Bus), HDMI (High Definition Multimedia Interface), RS-232 (Recommended Standard 232), or POTS (Plain Old Telephone Service). According to an embodiment, the network 1620 may be a communication network, which may include at least one of a computer network such as a LAN or a WAN, an internet, or a telephone network.

Each of the first and second external electronic devices 1020 and 1040 may be a device which is the same as or different from the electronic device 1010. According to an embodiment, the server 1060 may include a group of one or more servers.

According to various embodiments, all or some of the operations performed by the electronic device 1010 may be performed by another electronic device or a plurality of electronic devices (for example, the electronic device 1020, 1040 or server 1060). According to an embodiment, when the electronic device 1010 should perform some functions or services automatically or by a request, the electronic device 1010 may make a request for performing at least some functions related to the functions or services to another device (for example, the electronic device 1020 or 1040, or the server 1060) instead of performing the functions or services by itself or additionally. The other electronic device (for example, the electronic device 1020 or 1040, or the server 1060) may carry out the requested functions or the additional functions and provide results thereof to the electronic device 1010. The electronic device 1010 may provide requested functions or services based on the received results or after additionally processing the received results. To this end, for example, cloud computing, distributed computing, or client-server computing technology may be used.

Figure 13:
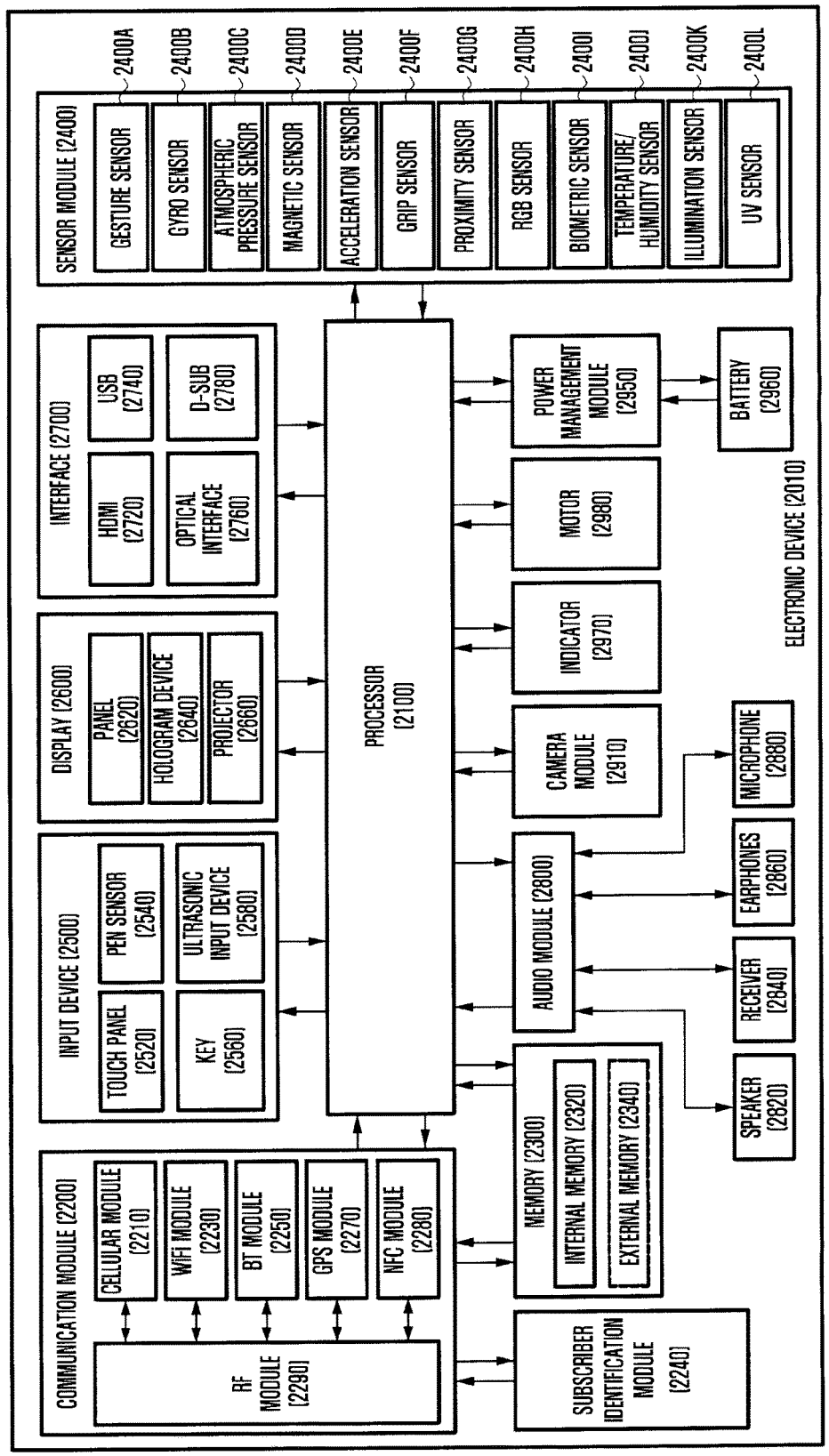
FIG. 13 is a block diagram illustrating an electronic device in accordance with various embodiments of the present disclosure.

FIG. 13 is a block diagram illustrating an electronic device 2010 in accordance with an embodiment of the present disclosure. The electronic device 2010 may form, for example, the whole or part of the electronic device 1010 shown in FIG. 12. Electronic device 2010 may include at least one application processor (AP) 2100, a communication module 2200, a subscriber identification module (SIM) 224, a memory 2300, a sensor module 2400 (which may include sensors 2400A-L), an input unit 2500, a display 2600, an interface 2700, an audio module 2800, a camera module 2910, a power management module 2950, a battery 2960, an indicator 2970, and a motor 2980.

The AP 2100 may drive an operating system or applications, control a plurality of hardware or software components connected thereto, and also perform processing and operation for various data including multimedia data. The AP 2100 may be formed of system-on-chip (SoC), for example. According to an embodiment, the AP 2100 may further include a graphic processing unit (GPU) and/or an image signal processor (not shown). The processor 210 may include at least some of the components (for example, a cellular module 2210) illustrated in FIG. 15. The processor 2100 may load instructions or data received from at least one other component (for example, a non-volatile memory) in a volatile memory, process the loaded instructions or data, and may store various types of data in a non-volatile memory.

The communication module 2200 (e.g., the communication interface 1700 of FIG. 12) may perform data communication with any other electronic device (e.g., the electronic device 1040 or the server 1060) connected to the electronic device 2000 (e.g., the electronic device 101) through the network. According to an embodiment, the communication module 2200 may include therein a cellular module 2210, a WiFi module 2230, a BT module 2250, a GPS module 2270, an NFC module 2280, and an RF (Radio Frequency) module 2290.

The cellular module 2210 may support a voice call, a video call, a message service, an internet service, or the like through a communication network (e.g., LTE, LTE-A, CDMA, WCDMA, UMTS, WiBro, or GSM, etc.). Additionally, the cellular module 2210 may perform identification and authentication of the electronic device in the communication network, using the SIM 2240. According to an embodiment, the cellular module 2210 may perform at least part of the functions the AP 2100 can provide. For example, the cellular module 2210 may perform at least part of a multimedia control function.

Each of the WiFi module 2230, the BT module 2250, the GPS module 2270 and the NFC module 2280 may include a processor for processing data transmitted or received therethrough. Although FIG. 15 shows the cellular module 2210, the WiFi module 2230, the BT module 2250, the GPS module 2270 and the NFC module 2280 as different blocks, at least part of them may be contained in a single IC (Integrated Circuit) chip or a single IC package in an embodiment.

The RF module 2290 may transmit and receive data, e.g., RF signals or any other electric signals. Although not shown, the RF module 2290 may include a transceiver, a PAM (Power Amp Module), a frequency filter, an LNA (Low Noise Amplifier), or the like. Also, the RF module 2290 may include any component, e.g., a wire or a conductor, for transmission of electromagnetic waves in a free air space. Although FIG. 13 shows that the cellular module 2210, the WiFi module 2230, the BT module 2250, the GPS module 2270 and the NFC module 2280 share the RF module 2290, at least one of them may perform transmission and reception of RF signals through a separate RF module in an embodiment.

The SIM 224 may be a specific card formed of SIM and may be inserted into a slot formed at a certain place of the electronic device. The SIM may contain therein an ICCID (Integrated Circuit Card IDentifier) or an IMSI (International Mobile Subscriber Identity).

The memory 2300 (e.g., the memory 1300) may include an internal memory 2320 and an external memory 2340. The internal memory 2320 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, or hard drive, etc.).

According to an embodiment, the internal memory 2320 may have the form of an SSD (Solid State Drive). The external memory 2340 may include a flash drive, e.g., CF (Compact Flash), SD (Secure Digital), Micro-SD (Micro Secure Digital), Mini-SD (Mini Secure Digital), xD (eXtreme Digital), MMC (MultiMediaCard), memory stick, or the like. The external memory 2340 may be functionally connected to the electronic device 2010 through various interfaces.

The sensor module 2400 may measure physical quantity or sense an operating status of the electronic device 2010, and then convert measured or sensed information into electric signals. The sensor module 2400 may include, for example, at least one of a gesture sensor 2400A, a gyro sensor 2400B, an atmospheric sensor 2400C, a magnetic sensor 2400D, an acceleration sensor 2400E, a grip sensor 2400F, a proximity sensor 2400G, a color sensor 2400H (e.g., RGB (Red, Green, Blue) sensor), a biometric sensor 2400I, a temperature-humidity sensor 2400J, an illumination sensor 2400K, and a UV (ultraviolet) sensor 2400L. Additionally or alternatively, the sensor module 2400 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 2400 may include a control circuit for controlling one or more sensors equipped therein. In some embodiments, the electronic device 2010 may further include a processor configured to control the sensor module 2400 as a part of or separately from the processor 2100, and may control the sensor module 2400 while the AP 2100 is in a sleep state.

The input unit 2500 may include a touch panel 2520, a digital pen sensor 2540, a key 2560, or an ultrasonic input unit 2580. The touch panel 2520 may recognize a touch input in a manner of capacitive type, resistive type, infrared type, or ultrasonic type. Also, the touch panel 2520 may further include a control circuit. The touch panel 2520 may further include a tactile layer. In this case, the touch panel 2520 may offer a tactile feedback to a user.

The digital pen sensor 2540 may be formed in the same or similar manner as receiving a touch input or by using a separate recognition sheet. The key 2560 may include, for example, a physical button, an optical key, or a keypad. The ultrasonic input unit 2580 is a specific device capable of identifying data by sensing sound waves with a microphone 2880 in the electronic device 200 through an input tool that generates ultrasonic signals, thus allowing wireless recognition.

The display 2600 (e.g., the display 1600 of FIG. 14) may include a panel 2620, a hologram 2640, or a projector 2660. The panel 2620 may be, for example, LCD (Liquid Crystal Display), AM-OLED (Active Matrix Organic Light Emitting Diode), or the like. The panel 2620 may have a flexible, transparent or wearable form. The panel 2620 may be formed of a single module with the touch panel 2520. The hologram 2640 may show a stereoscopic image in the air using interference of light. The projector 2660 may project an image onto a screen, which may be located at the inside or outside of the electronic device 2010. According to an embodiment, the display 2600 may further include a control circuit for controlling the panel 2620, the hologram 2640, and the projector 2660.

The interface 2700 may include, for example, an HDMI (High-Definition Multimedia Interface) 2720, a USB (Universal Serial Bus) 2740, an optical interface 2760, or a D-sub (D-subminiature) 2780. The interface 2700 may be contained, for example, in the communication interface 1700 shown in FIG. 14. Additionally or alternatively, the interface 2700 may include, for example, an MHL (Mobile High-definition Link) interface, an SD (Secure Digital) card/MMC (Multi-Media Card) interface, or an IrDA (Infrared Data Association) interface.

The audio module 2800 may perform a conversion between sounds and electric signals. At least part of the audio module 2800 may be contained, for example, in the input/output interface 1400 shown in FIG. 14. The audio module 2800 may process sound information inputted or outputted through a speaker 2820, a receiver 2840, an earphone(s) 2860, or a microphone 2880.

The camera module 2910 is a device capable of obtaining still images and moving images. According to an embodiment, the camera module 2910 may include at least one image sensor (e.g., a front sensor or a rear sensor), a lens (not shown), an ISP (Image Signal Processor, not shown), or a flash (e.g., LED or xenon lamp, not shown).

The power management module 2950 may manage electric power of the electronic device 2010. Although not shown, the power management module 2950 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 2960 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 2960 and a voltage, current or temperature in a charging process. The battery 2960 may store or create electric power therein and supply electric power to the electronic device 2010. The battery 2960 may be, for example, a rechargeable battery or a solar battery.

The indicator 2970 may show thereon a current status (e.g., a booting status, a message status, or a recharging status) of the electronic device 2010 or of its part (e.g., the AP 2100). The motor 298 may convert an electric signal into a mechanical vibration. Although not shown, the electronic device 2010 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 14:
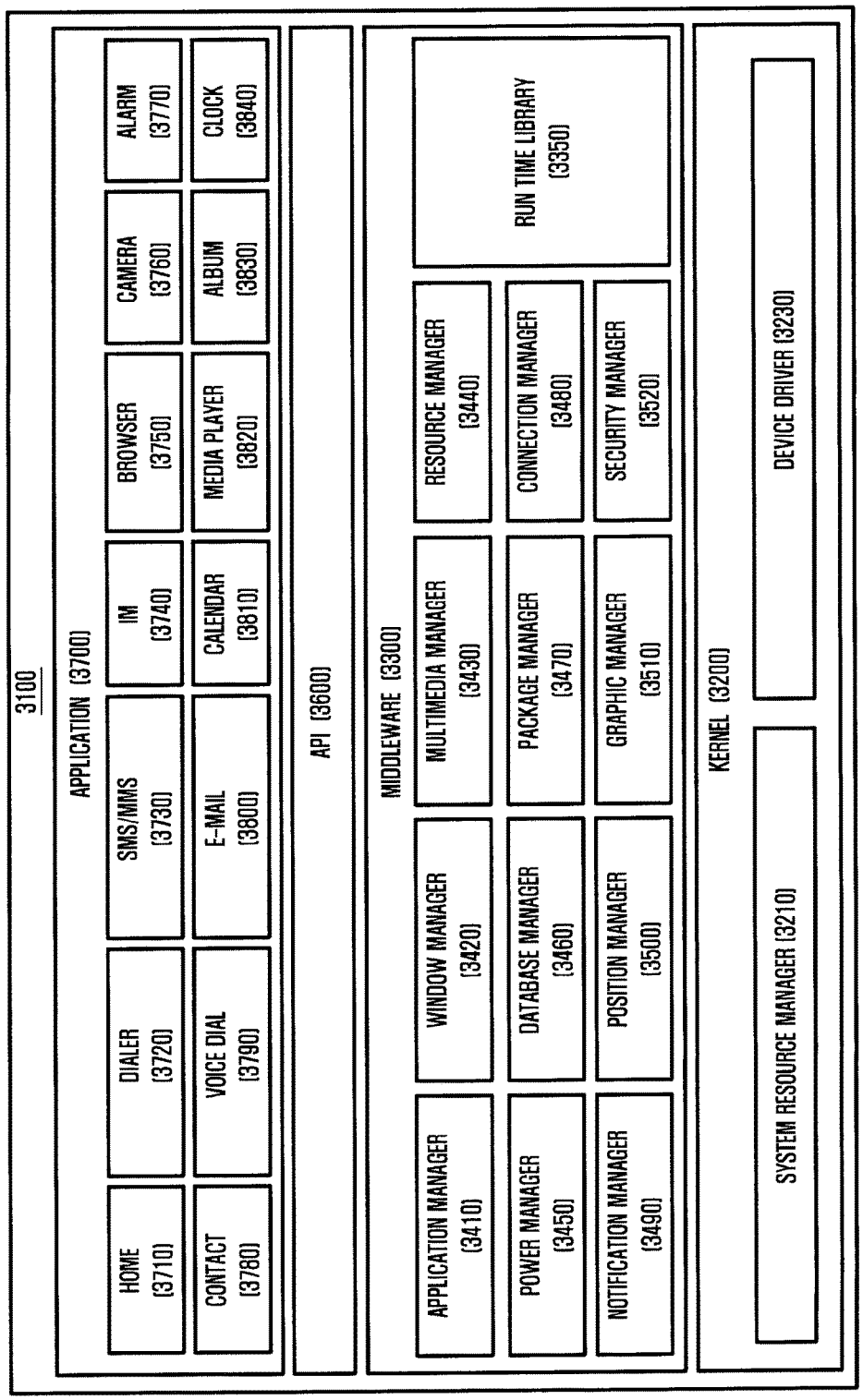
FIG. 14 is a block diagram illustrating a programing module in accordance with various embodiments of the present disclosure.

FIG. 14 is a block diagram illustrating a configuration of a programming module according to an embodiment of the present disclosure. The programming module 3100 may be included (or stored) in the electronic device 1010 (e.g., the program 1400) or may be included (or stored) in the electronic device 2010 (e.g., the memory 230) illustrated in FIG. 14 or 15. At least a part of the programming module 3100 may be implemented in software, firmware, hardware, or a combination of two or more thereof. The programming module 3100 may be implemented in hardware (e.g., the hardware 2010), and may include an OS controlling resources related to an electronic device (e.g., the electronic device 1010) and/or various applications (e.g., an application 370) executed in the OS. For example, the OS may be Android, iOS, Windows, Symbian, Tizen, Bada, and the like.

Referring to FIG. 14, the programming module 3100 may include a kernel 3200, a middleware 3300, an API 3600, and/or the application 3700.

The kernel 3200 (e.g., the kernel 1410) may include a system resource manager 3210 and/or a device driver 3230. The system resource manager 3210 may include, for example, a process manager (not illustrated), a memory manager (not illustrated), and a file system manager (not illustrated). The system resource manager 3210 may perform the control, allocation, recovery, and/or the like of system resources. The device driver 3230 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 3230 may include an Inter-Process Communication (IPC) driver (not illustrated).

The middleware 3300 may include multiple modules previously implemented so as to provide a function used in common by the applications 3700. Also, the middleware 3300 may provide a function to the applications 3700 through the API 3600 in order to enable the applications 3700 to efficiently use limited system resources within the electronic device. For example, as illustrated in FIG. 16, the middleware 3030 (e.g., the middleware 1430) may include at least one of a runtime library 3350, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, a security manager 3520, and any other suitable and/or similar manager.

The runtime library 3350 may include, for example, a library module used by a complier, in order to add a new function by using a programming language during the execution of the application 3700. According to an embodiment of the present disclosure, the runtime library 3350 may perform functions which are related to input and output, the management of a memory, an arithmetic function, and/or the like.

The application manager 3410 may manage, for example, a life cycle of at least one of the applications 3700. The window manager 3420 may manage GUI resources used on the screen. The multimedia manager 3430 may detect a format used to reproduce various media files and may encode or decode a media file through a codec appropriate for the relevant format. The resource manager 3440 may manage resources, such as a source code, a memory, a storage space, and/or the like of at least one of the applications 3700.

The power manager 3450 may operate together with a Basic Input/Output System (BIOS), may manage a battery or power, and may provide power information and the like used for an operation. The database manager 3460 may manage a database in such a manner as to enable the generation, search and/or change of the database to be used by at least one of the applications 3700. The package manager 3470 may manage the installation and/or update of an application distributed in the form of a package file.

The connectivity manager 3480 may manage a wireless connectivity such as, for example, Wi-Fi and Bluetooth. The notification manager 3490 may display or report, to the user, an event such as an arrival message, an appointment, a proximity alarm, and the like in such a manner as not to disturb the user. The location manager 3500 may manage location information of the electronic device. The graphic manager 3510 may manage a graphic effect, which is to be provided to the user, and/or a user interface related to the graphic effect. The security manager 3520 may provide various security functions used for system security, user authentication, and the like. According to an embodiment of the present disclosure, when the electronic device (e.g., the electronic device 1010) has a telephone function, the middleware 3300 may further include a telephony manager (not illustrated) for managing a voice telephony call function and/or a video telephony call function of the electronic device.

The middleware 3300 may generate and use a new middleware module through various functional combinations of the above-described internal element modules. The middleware 3300 may provide modules specialized according to types of OSs in order to provide differentiated functions. Also, the middleware 3300 may dynamically delete some of the existing elements, or may add new elements. Accordingly, the middleware 3300 may omit some of the elements described in the various embodiments of the present disclosure, may further include other elements, or may replace the some of the elements with elements, each of which performs a similar function and has a different name.

The API 3600 (e.g., the API 1450) is a set of API programming functions, and may be provided with a different configuration according to an OS. In the case of Android or iOS, for example, one API set may be provided to each platform. In the case of Tizen, for example, two or more API sets may be provided to each platform.

The applications 3700 (e.g., the applications 1470) may include, for example, a preloaded application and/or a third party application. The applications 3700 (e.g., the applications 1470) may include, for example, a home application 3710, a dialer application 3720, a Short Message Service (SMS)/Multimedia Message Service (MMS) application 3730, an Instant Message (IM) application 3740, a browser application 3750, a camera application 3760, an alarm application 3770, a contact application 3780, a voice dial application 3790, an electronic mail (e-mail) application 3800, a calendar application 3810, a media player application 3820, an album application 3830, a clock application 3840, and any other suitable and/or similar application.

According to embodiments, the application 3700 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 3700 may be an application associated with an exchange of information between the electronic device 1010 and any external electronic device (e.g., an external electronic device 1020 or 1040). This type of application may include a notification relay application for delivering specific information to an external electronic device, or a device management application for managing an external electronic device.

For example, the notification relay application may include a function to deliver notification information created at any other application of the electronic device 1010 (e.g., the SMS/MMS application, the email application, the health care application, or the environment information application, etc.) to an external electronic device (e.g., the electronic device 1020 or 1040). Additionally or alternatively, the notification relay application may receive notification information from an external electronic device and offer it to a user. The device management application may manage (e.g., install, remove or update) a certain function (a turn-on/turn-off of an external electronic device (or some components thereof), or an adjustment of brightness (or resolution) of a display) of any external electronic device communicating with the electronic device 1010, a certain application operating at such an external electronic device, or a certain service (e.g., a call service or a message service) offered by such an external electronic device.

According to embodiments, the application 3700 may include a specific application specified depending on attributes (e.g., a type) of an external electronic device (e.g., the electronic device 1020 or 1040). For example, in case an external electronic device is an MP3 player, the application 134 may include a specific application associated with a play of music. Similarly, in case an external electronic device is a portable medical device, the application 3700 may include a specific application associated with a health care. In an embodiment, the application 3700 may include at least one of an application assigned to the electronic device 1010 or an application received from an external electronic device (e.g., the server 1060 or the electronic device 1040). According to an embodiment, the applications 3700 may include a preloaded application or a third party application which can be downloaded from the server. Names of the components of the program module 3100 according to the above described embodiments may vary depending on the type of operating system.

According to various embodiments, at least some of the programming module 3100 may be implemented in software, firmware, hardware, or a combination of two or more thereof. At least some of the programming module 3100 may be implemented (for example, executed) by, for example, the processor (for example, the processor 2100). At least some of the programming module 310 may include, for example, a module, program, routine, sets of instructions, or process for performing one or more functions. As used in the present disclosure, the expression "include" or "may include" or "can include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

As used in the present disclosure, the expression "and/or" includes any or all combinations of words enumerated together. For example, the expression "A or B" or "at least one of A and B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Herein, the term "color-blind"" is used to refer to a person with any color-vision-deficiency. Herein, "correcting"" a color-blind condition or like phrase refers to improving the ability of the person to see a colored object or to distinguish between objects of different colors.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, electronic tattoos, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ships (e.g., a marine navigation system, a gyrocompass, etc.), avionics, security equipment, head unit for vehicles, an industrial or home robot, an automatic teller machine of financial institutions, point of sales of stores, or internet of things (e.g., a light bulb, various sensors, electricity or gas meter, a sprinkler, a fire alarm, a thermostat, a street lamp, a toaster, exercise equipment, a hot-water tank, a heater, a boiler, etc.).

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. Further, the electronic device according to the present disclosure may be a flexible device. It is noted that the above-mentioned electronic devices are exemplary only and not to be considered as a limitation of this disclosure.

Hereinafter, an electronic device according to various embodiments of the present disclosure will be discussed with reference to the accompanying drawings. The term "a user"" as used in various embodiments may refer to any person who uses an electronic device or any other device (e.g., an artificial intelligence electronic device) using an electronic device.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., a processor as described hereinabove), may cause the one or more processors to execute the function corresponding to the instruction. The computer-readable storage medium may be, for example, a memory as described hereinabove.

The above-discussed methods have been described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Moreover, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As described above, according to the various embodiments of the present disclosure, the wearable device can be usually worn while being set to a basic fastening length without a feeling of close contact, and in a situation where a feeling of close contact is required for an operation of a sensor, the length of the band can be adjusted to provide the feeling of close contact in an easy and simple manner without the release of the device, by sliding the buckle assembly cover, adjusting the band length, and then locking the buckle assembly.

While this disclosure has been particularly shown and described with reference to exemplary embodiments thereof, it will be understood by those skilled in the art that various changes in form and details may be made therein without departing from the spirit and scope of this disclosure as defined by the appended claims.

What is claimed is:

1. A buckle apparatus for a wearable device, comprising:
a main body;
a band for providing the main body to be adapted on a wrist; and
a buckle assembly comprising a cover part to which a first end of the band is coupled and a coupling part in which a second end of the band is inserted into and maintained in, wherein the cover part comprises an upper cover and a lower cover coupled to each other to form rails, and the coupling part comprises first and second link pieces hingedly coupled to each other and is assembled to a lower portion of the cover part, wherein the upper cover comprises a band fixing part into which the first end of the band is inserted, a spring accommodating part formed to accommodate a spring therein, and a screw-fastening part.

2. The buckle apparatus of claim 1, further comprising:
a sliding locking part comprising a sliding assembly for locking sliding of the cover part;
a plate spring cooperating with the sliding assembly to cause a stopper to move down when the sliding assembly slides in a first direction and to move up when the sliding assembly slides in a second direction opposite of the first direction; and
a spring for pressing the sliding assembly in one direction.

3. The buckle apparatus of claim 2, wherein opposite ends of the plate spring are coupled to the upper cover and the stopper, respectively.

4. The buckle apparatus of claim 3, wherein the sliding assembly further comprises sliding frames formed on opposite sides thereof to move along the rails formed in the cover part, a positioning protrusion on which the plate spring is seated, and an insertion protrusion inserted into the spring.

5. The buckle apparatus of claim 3, wherein the plate spring comprises a corrugated section that is bent a predetermined number of times and has resilience, a screw-fastening piece formed on one end thereof, which is screw-coupled to the upper cover, and a fastening hook formed on an opposite end thereof, which is fastened to the stopper, and the stopper comprises a fastening recess to which the fastening hook is fastened.

6. The buckle apparatus of claim 2, wherein the sliding assembly has a pin-coupling hole inserted between the rails to move along the rails formed by the upper and lower covers.

7. The buckle apparatus of claim 2, wherein the sliding assembly of the sliding locking part slides in the first direction opposite to the sliding of the cover part to compress the spring, and the stopper moves downward and is stopped by the second link piece to lock the sliding of the cover part.

8. The buckle apparatus of claim 2, wherein, while the stopper moves downward and is stopped by the second link piece, the stopper is moved upward by the sliding of the cover part in the second direction, and the sliding assembly returns to an original position by a resilience of the spring.

9. The buckle apparatus of claim 1, wherein the first link piece comprises pin-coupling holes formed on opposite ends thereof and a fastening piece protruding downward from a rear surface thereof between the pin-coupling holes, and
the second link piece comprises an insertion piece on one end thereof, into which the second end of the band is inserted, an opening formed on an upper portion of the insertion piece, a protruding piece integrally protruding from a front surface of the insertion piece, a pin-coupling hole on an opposite end thereof to correspond to the pin-coupling hole provided in the first link piece, and a pole protruding downward from a center thereof.

10. The buckle apparatus of claim 9, wherein the fastening piece of the first link piece is fastened to the opening formed in the insertion piece of the second link piece such that a length of the band is set to a basic fastening length for wearing the wearable device.

11. The buckle apparatus of claim 9, wherein the pole of the second link piece is inserted into one of a plurality of fastening holes formed on the second end of the band such that the band is set to a basic fastening length.

12. The buckle apparatus of claim 1, wherein the lower cover comprises rail frames formed on opposite sides thereof, an opening formed in a center thereof, a stopper coupling part to which the stopper is coupled so as to be movable up and down, a spring accommodating part for accommodating the spring therein, screw-fastening holes formed on opposite sides of the spring accommodating part, and a pair of fastening protrusions inserted into a pair of insertion holes formed on the first end of the band.

13. The buckle apparatus of claim 1, wherein the upper cover and the lower cover comprises a screw fastening part and a screw-fastening hole, respectively, and the screw fastening part and the screw-fastening hole are formed to correspond to each other.

14. A buckle apparatus for a wearable device, comprising:
a main body;
a band for providing the main body to be adapted on a wrist;
a buckle assembly including a cover part to which a first end of the band is coupled and a coupling part in which a second end of the band is inserted into and maintained in, wherein the cover part comprises an upper cover and a lower cover coupled to each other to form rails, and the coupling part comprises first and second link pieces hingedly coupled to each other and is assembled to a lower portion of the cover part;
a sliding locking part having a sliding assembly for locking sliding of the cover part;
a plate spring cooperating with the sliding assembly to cause a stopper to move down when the sliding assembly slides in a first direction and to move up when the sliding assembly slides in a second direction opposite of the first direction; and
a spring for pressing the sliding assembly in one direction.

15. The buckle apparatus of claim 14, wherein the sliding assembly has a pin-coupling hole inserted between the rails to move along the rails formed by the upper and lower covers.

16. The buckle apparatus of claim 14, wherein the sliding assembly further comprises sliding frames formed on opposite sides thereof to move along the rails formed in the cover part, a positioning protrusion on which the plate spring is seated, and an insertion protrusion inserted into the spring.

17. The buckle apparatus of claim 14, wherein the first link piece comprises pin-coupling holes formed on opposite ends thereof and a fastening piece protruding downward from a rear surface thereof between the pin-coupling holes, and
the second link piece comprises an insertion piece on one end thereof, into which the second end of the band is inserted, an opening formed on an upper portion of the insertion piece, a protruding piece integrally protruding from a front surface of the insertion piece, a pin-coupling hole on an opposite end thereof to correspond to the pin-coupling hole provided in the first link piece, and a pole protruding downward from a center thereof.

18. The buckle apparatus of claim 14, wherein the sliding assembly of the sliding locking part slides in the first direction opposite to the sliding of the cover part to compress the spring, and the stopper moves downward and is stopped by the second link piece to lock the sliding of the cover part.

19. The buckle apparatus of claim 14, wherein, while the stopper moves downward and is stopped by the second link piece, the stopper is moved upward by the sliding of the cover part in the second direction, and the sliding assembly returns to an original position by a resilience of the spring.

* * * * *